(12) United States Patent
An et al.

(10) Patent No.: US 9,637,079 B2
(45) Date of Patent: May 2, 2017

(54) DATUM TO PROVIDE ADDITIONAL RETENTION FORCE

(71) Applicant: Toyota Motor Engineering & Manufacturing North America, Inc., Erlanger, KY (US)

(72) Inventors: Chae Hon An, Northville, MI (US); James L. Belanger, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 15 days.

(21) Appl. No.: 14/698,308

(22) Filed: Apr. 28, 2015

(65) Prior Publication Data

US 2016/0318470 A1    Nov. 3, 2016

(51) Int. Cl.
*B60R 13/02* (2006.01)
*B60R 21/205* (2011.01)
*B60K 37/00* (2006.01)

(52) U.S. Cl.
CPC ............ *B60R 21/205* (2013.01); *B60K 37/00* (2013.01); *B60R 13/0206* (2013.01); *B60R 13/0256* (2013.01); *B60R 2013/0287* (2013.01)

(58) Field of Classification Search
CPC ... B60R 21/205; B60R 21/2155; B60R 11/02; B60R 11/0235; B60R 2011/0042; B60R 2011/0005; B60R 2011/0059; B60R 2011/0294; B60R 13/0256; B60R 2013/0287; B60R 13/0206; B62D 25/14; H04B 2001/084
See application file for complete search history.

(56) References Cited

U.S. PATENT DOCUMENTS

| 1,677,279 | A |   | 7/1928  | Ford    |                      |
|-----------|---|---|---------|---------|----------------------|
| 3,801,767 | A | * | 4/1974  | Marks   | H01H 35/00 180/272   |
| 4,865,505 | A | * | 9/1989  | Okada   | B60N 3/046 24/293    |
| 5,347,691 | A | * | 9/1994  | Terazoe | B60R 13/0206 24/289  |
| 5,778,063 | A | * | 7/1998  | Dunchock| B60R 11/0211 379/446 |
| 6,074,150 | A | * | 6/2000  | Shinozaki | B60R 13/0206 24/297 |
| 6,092,916 | A | * | 7/2000  | Davis, Jr. | B60Q 3/0203 362/488 |
| 6,316,778 | B1| * | 11/2001 | Goodman | B60R 99/00 250/221   |
| 6,481,682 | B2| * | 11/2002 | Miura   | F16B 5/0635 24/297   |

(Continued)

*Primary Examiner* — Paul N Dickson
*Assistant Examiner* — Timothy Wilhelm
(74) *Attorney, Agent, or Firm* — Dinsmore & Shohl LLP

(57) ABSTRACT

An instrument panel assembly having structure designed to restrict the motion of a panel member of the instrument panel assembly in certain situations, such as airbag deployment is disclosed. A panel member is secured to the instrument panel main body. A primary alignment post extends from the back surface of the panel member and includes a retention notch. The retention notch catches on a first edge of a first aperture of the instrument panel and restricts the motion of the panel member when a force of the second type is applied.

20 Claims, 7 Drawing Sheets

(56) References Cited

U.S. PATENT DOCUMENTS

| | | | | |
|---|---|---|---|---|
| 6,857,168 B2* | 2/2005 | Lubera | | B60N 3/026 24/293 |
| 7,198,315 B2 | 4/2007 | Cass et al. | | |
| 7,360,964 B2* | 4/2008 | Tsuya | | B60R 13/0206 24/292 |
| 7,669,807 B2* | 3/2010 | Stigler | | B60R 11/00 248/229.16 |
| 7,900,953 B2* | 3/2011 | Slobodecki | | B60R 13/0206 24/293 |
| 8,297,676 B2* | 10/2012 | Osterhout | | B60R 13/0206 280/728.2 |
| 8,442,756 B2* | 5/2013 | Masuda | | B60R 11/02 701/409 |
| 8,646,827 B2* | 2/2014 | Zimmerman | | B60R 13/0256 180/90 |
| 8,677,573 B2* | 3/2014 | Lee | | B60R 13/0206 24/289 |
| 8,899,651 B2* | 12/2014 | Schulz | | B60N 2/4686 296/24.34 |
| 9,067,540 B2* | 6/2015 | Watanabe | | B60R 13/0206 |
| 9,352,700 B2* | 5/2016 | Prin | | B60R 11/0205 |
| 2001/0046426 A1* | 11/2001 | Lubera | | B60N 3/026 411/182 |
| 2005/0062294 A1* | 3/2005 | Wu | | B60R 11/0211 292/177 |
| 2005/0225062 A1* | 10/2005 | Dumbrique | | B60R 21/2165 280/728.3 |
| 2006/0117535 A1* | 6/2006 | Fraser | | B60R 13/0206 24/289 |
| 2008/0028577 A1 | 2/2008 | Soman et al. | | |
| 2009/0179458 A1* | 7/2009 | Miki | | B60R 13/02 296/191 |
| 2009/0268411 A1* | 10/2009 | Baker | | B60R 11/02 361/724 |
| 2010/0199468 A1* | 8/2010 | Matsui | | B60R 11/00 24/457 |
| 2010/0213730 A1* | 8/2010 | Biggs | | B60K 37/06 296/1.08 |
| 2011/0131918 A1* | 6/2011 | Glynn | | B60R 13/0206 52/716.1 |
| 2012/0119532 A1* | 5/2012 | She | | B60R 13/025 296/1.08 |
| 2013/0099518 A1* | 4/2013 | Kwolek | | B60R 13/0262 296/1.08 |
| 2013/0249230 A1 | 9/2013 | Gillay et al. | | |
| 2014/0022716 A1* | 1/2014 | Hondo | | H05K 5/0221 361/679.01 |
| 2015/0026933 A1* | 1/2015 | Komeno | | B60R 13/0206 24/457 |
| 2015/0048217 A1* | 2/2015 | Prin | | B60K 37/04 248/27.1 |
| 2015/0165982 A1* | 6/2015 | Okitsu | | B60R 11/00 403/326 |
| 2015/0175091 A1* | 6/2015 | Morris | | B60R 13/0206 296/1.08 |
| 2015/0375797 A1* | 12/2015 | Morris | | F16B 2/22 296/193.05 |

* cited by examiner

DATUM TO PROVIDE ADDITIONAL RETENTION FORCE

FIELD OF THE INVENTION

The present invention relates to instrument panel assemblies, in particular instrument panel assemblies having structure designed to restrict the motion of a panel member of the instrument panel assembly in certain situations, such as airbag deployment.

BACKGROUND OF THE INVENTION

It is generally known to use various clips, tethers and posts to align and restrain a panel member of an instrument panel. Such structures usually include a deformable portion which snaps or engages with the instrument panel to secure the panel member to the instrument panel assembly in various situations, such as when the instrument panel is subjected to forces generated by an airbag deployment. One such attachment mechanism is shown in U.S. Patent Application Publication 2012/0119532 incorporated herein by reference.

The previous attachment mechanisms known in the art, however, share a common problem in that when the panel member is desired to be removed, such removal may be made difficult by the attachment mechanism. For example, the attachment mechanism may have to be plastically deformed or broken to remove the panel member, such deformation or fracture inhibiting the ability to reuse/reinstall the panel member.

Accordingly, it is the object of the present disclosure to provide an attachment mechanism for a panel member that allows the panel member to be removed when so desired without damaging or otherwise rendering the retention mechanism unsuitable for future use.

SUMMARY OF THE INVENTION

An instrument panel assembly of the present disclosure includes an instrument panel main body that has an aperture which is defined in part by a first edge and a second edge with the first edge opposing the second edge and the second edge spaced apart from the first edge by a distance. A panel member is secured to the instrument panel main body. The panel member includes a front surface and a back surface. A primary alignment post extends from the back surface of the panel member. The primary alignment post has a first alignment surface and a second alignment surface. The first alignment surface opposes the second alignment surface. The first alignment surface includes a retention notch. The first alignment surface of the primary alignment post is separated from the second alignment surface of the primary alignment post by a distance. The distance separating the first alignment surface from the second alignment surface is generally equal to the distance separating the first edge of the aperture from the second edge of the aperture. The primary alignment post is received by the aperture. The primary alignment post freely moves within the primary aperture when a force of a first type is applied. The retention notch catches on the first edge of the first aperture and restricts the motion of the panel member when a force of the second type is applied.

and

Figure 11:
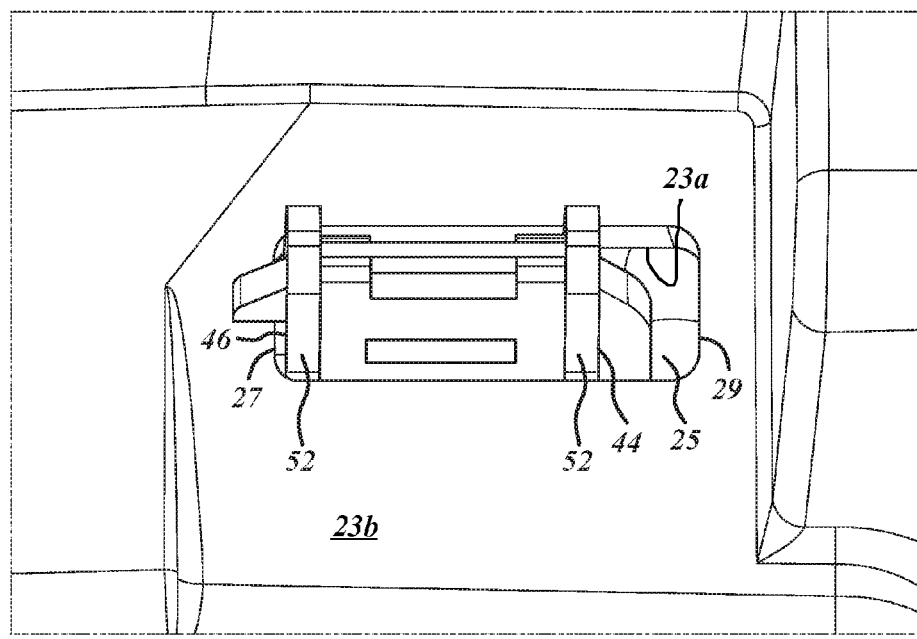

FIG. 11 is a perspective view of a notch of a secondary alignment post engaging the first aperture.

DETAILED DESCRIPTION OF THE PREFERRED EMBODIMENTS

The present disclosure enables a panel member of an instrument panel assembly to be freely removed when so desired upon the application of one type of force while at the same time restricts movement of the panel member in relation to the instrument panel assembly upon application of another type of force. Such enablement is provided by a specialized post which extends from the panel member and is received into an aperture of the instrument panel assembly. The post is designed such that it fits into and out of the aperture without any type of deformation and the post is further designed to engage with the instrument panel assembly in certain situations to restrict motion of the panel member.

With reference now to the figures, an instrument panel assembly 20 is shown. The instrument panel assembly includes an instrument panel main body 23 which includes a first aperture 25, an exterior surface 23a and an opposite interior surface 23b. The first aperture 25 is defined in part by a first edge 27 and a second edge 29. The first edge 27 opposes the second edge 29. The first edge 27 and the second edge 29 extending between the exterior surface 23a and the interior surface 23b of the instrument panel main body 23. The first edge 27 of the first aperture 25 is spaced apart from the second edge 27 of the first aperture 25 by a distance D1

The instrument panel assembly 20 also includes a panel member 35 which is secured to the instrument panel main body 23. The panel member 35 has a front surface 37 and a back surface 39. A primary alignment post 40 extends from the back surface 39 of the panel member 35. The primary alignment post 40 has a first alignment surface 42 and a second alignment surface 44. The first alignment surface 42 includes a retention notch 46. The first alignment surface 42 of the primary alignment post 40 is separated from the second alignment surface 44 of the primary alignment post 40 by a distance D2. The distance D2 may be a predetermined distance such that the distance D1 separating the first edge 27 of the first aperture 25 from the second edge 29 of the first aperture 25 is generally equal to the distance D2 between separating the first alignment surface 42 of the primary alignment post 40 from the second alignment surface 44 of the primary alignment surface 40. The primary alignment post 40 is received within the first aperture 25. The primary alignment post 40 is free to move when a force of a first type is applied and the alignment post 40 and associated panel member 25 is restricted in motion by the retention notch 46 catching on the first edge 27 of the first aperture 25 when a force of a second type is applied.

The instrument panel main body 23 is generally located at a front of a vehicle cabin. The instrument panel main body 23 is typically assembled from multiple component parts, and houses other vehicle systems such airbags, electronics including stereos, navigation systems, and other infotainment, gauge clusters, cabin climate controls, vents, etc. The instrument panel main body 23 runs the width of the vehicle interior from left to right, and may be made of injection molded plastic, or other suitable material known to those skilled in the art.

The first aperture 25 is an opening in the instrument panel main body 23 designed to receive the primary alignment post 40. The first aperture 25 is defined by a generally rectangular perimeter. The shorter of the sides of the general rectangular shape defining the first aperture 25 are the first edge 27 and the second edge 29. The first edge 27 and second edge 29 are arraigned on opposite ends of the first aperture 25 from each other.

The panel member 35 has a contoured rectangular shape designed to conform and compliment the design of the instrument panel main body 23. The panel member 35 is centrally located on the instrument panel main body 23 between a driver side of the vehicle cabin and a passenger side of the vehicle cabin. The panel member 35 provides a protective and aesthetically pleasing cover to a stereo, climate control, or other similar infotainment system utilized in the vehicle. It is desirable to be able to remove the panel member 35 from the instrument panel main body 23 without damage so that the infotainment system may be replaced, while at the it is desirable to have the panel member 35 restricted in the available motion, such as during an airbag deployment.

The primary alignment post 40 extends from the back surface 39 of the panel member 35. The direction in which the primary alignment post 40 extents is defined as the axial direction of the primary alignment post 40. When viewed from the top, or such that the primary alignment post 40 is extending towards the viewer, the primary alignment post 40 has H-type shape with an elongated center bar. The ends of the elongated center bar provide the first alignment surface 42 and second alignment surface 44.

The first alignment surface 42 is smooth and generally planar, with an exception of a ramped portion located at the end of the primary alignment post 40 furthest from the panel member35. The first alignment surface 42 faces perpendicularly away from the axial direction of the extending direction of the primary alignment post 40. To put it another way, the planar portion of the first alignment surface aligns with from the axial direction of the extending direction of the primary alignment post 40.

The retention notch 46 in the first alignment surface 42 is best described as a cutout or depression within the first alignment surface 42. The retention notch 46 is defined in part by a first wall 48 and a second wall 50. The first wall 48 and second wall 50 oppose each other and are both generally perpendicular to the first alignment surface 42. The spacing between the first wall 48 and the second wall 50 is generally greater than or equal to a thickness of the instrument panel body 23 in an area proximate the first aperture 25 at the first edge 27.

Second alignment surface 44 is similar to the first alignment surface 42 in that the second alignment surface is smooth and generally planar, with an exception of a ramped portion located at the end of the primary alignment post furthest from the panel member 35. The second alignment surface 44 faces perpendicularly away from the axial direction of the extending direction of the primary alignment post 40, and in an opposite direction, or 180 degrees, from the first alignment surface 42. The second alignment surface 44 does not include a retention notch. The lack of a retention notch in the second alignment surface 44 enables the panel member 35 to be more easily removed. For example, the panel member 35 is urged such that the second alignment surface 44 is pressed against the second edge 29 of the first aperture 35, the primary alignment post 40 will slide freely, as opposed to where the panel member 35 is urged such that the first alignment surface 42 is pressed against the first edge 27 of the first aperture 35 thereby causing the retention notch 46 to catch on the first edge 27 of the first aperture 25.

Figure 9:
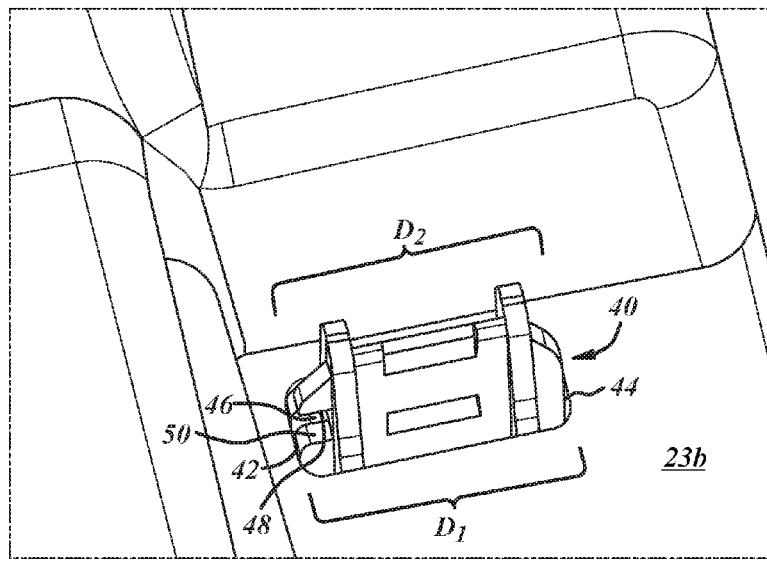
FIG. 9 is a perspective view of a primary alignment post in a first aperture.
Figure 10:
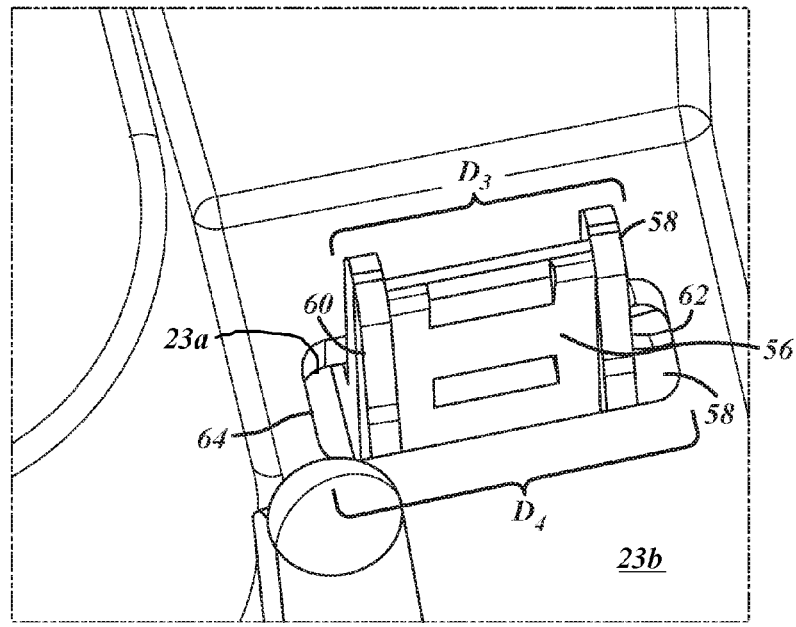
FIG. 10 is a perspective view of a secondary alignment post in a second aperture.

As shown in FIG. 9, the primary alignment post 40 is provided in an installed position in which the panel member 35 is installed on the instrument panel assembly 20. The first edge 27 of the first aperture 25 and second edge 29 of the first aperture 25 are spaced apart by a distance D1. The first alignment surface 42 of the primary alignment post40 and the second alignment surface 44 of the primary alignment post 40 are spaced apart by a distance D2. D1 and D2 are related such that the primary alignment post 40 may be received by the first aperture 25 without a forced insertion that would require a deformation of the aperture perimeter or the primary alignment post 40. To put it another way, the fit of the primary alignment post 40 within the first aperture 25 may be snug, but is not an interference type fit. In addition to not being too tight, the relationship between distance D1 and distance D2 is such that there is excessive slop or gapping between the first aperture 25 and the primary alignment post40, such excessive slop being identifiable by one skilled in the art of instrument panel assembly and quality control. Generally distance D1 is equal to distance D2, with dimensional tolerancing such that the distance D2 may possibly be slightly smaller than distance D1.

The primary alignment post 40 further includes a third alignment surface 52 and a fourth alignment surface 54. The third alignment surface 52 of the primary alignment post 40 opposes the fourth alignment surface 54 of the primary alignment post 40. The third alignment surface 52 of the primary alignment post 40 and fourth alignment surface 54 of the primary alignment post 40 are located on surfaces of the H-shaped primary alignment post 40 that are generally perpendicular to the first alignment surface 42 of the primary alignment post 40 and the second alignment surface 44 of the primary alignment post 40 at the distal ends of the vertical bars of the H-shape.

A secondary alignment post 56 may also extend from the back surface 39 of the panel member 35. The secondary alignment post 56 may be received in a second aperture 58 of the instrument panel main body 23. The secondary alignment post includes a first surface 58 and a second surface 60. The first surface 58 and second surface 60 are separated by a distance D3. The distance D3 separating the first surface 58 from the second surface 60 is less than a distance D4 separating a first edge 62 of the first aperture 58 from a second edge 64 of the second aperture 58. The difference in the distance D3 separating the first surface 58 from the second surface 60 and the distance D4 separating the first edge 62 of the second aperture 58 and the second edge 64 of the second aperture 58 is within a predetermined range.

The predetermined range is determined by using geometric stack tolerancing and manufacturing capabilities such that various maximum material conditions and minimum material conditions are taken into account to ensure that both the primary alignment post 40 is received by the first aperture 25 and the secondary alignment post 56 is received by the second aperture 58.

Figure 1:
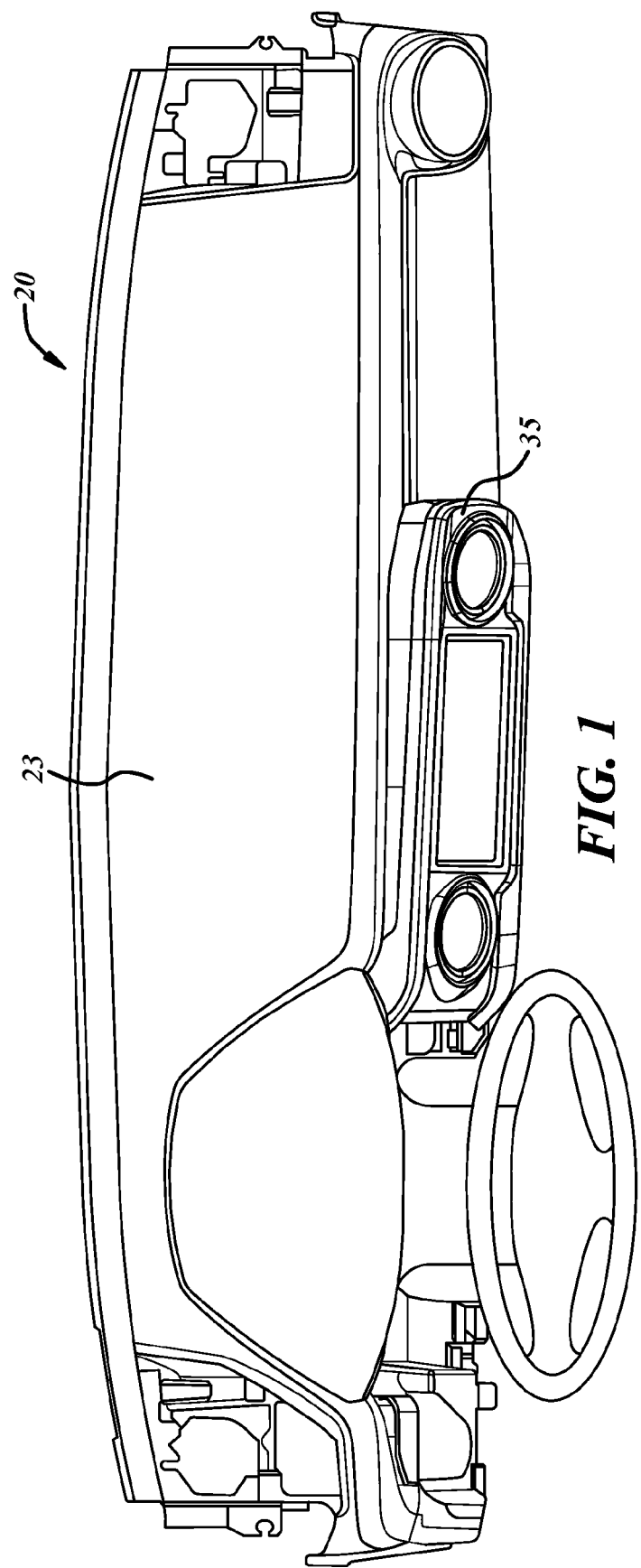
FIG. 1 is a perspective view of an instrument panel assembly.
Figure 2:
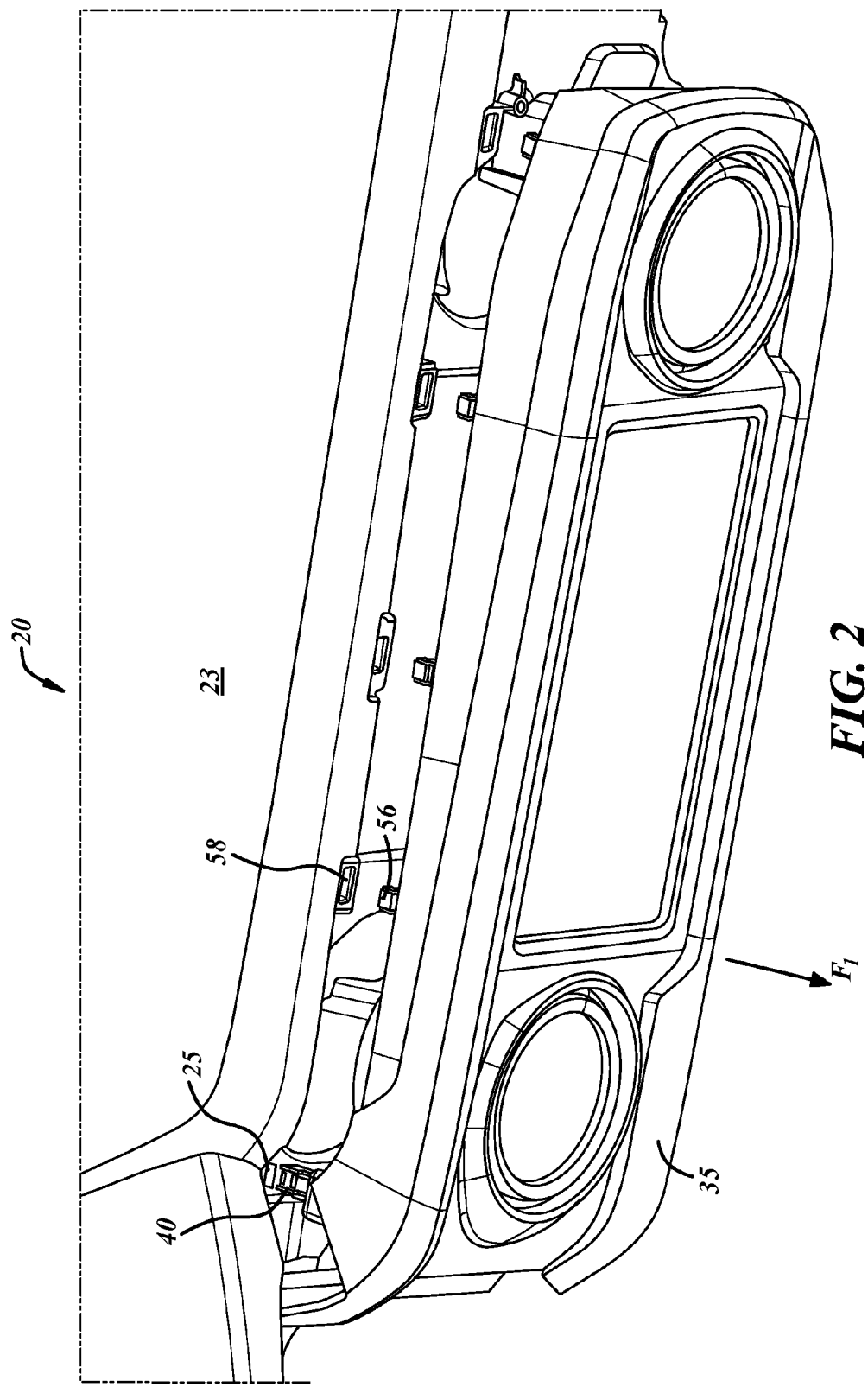
FIG. 2 is a perspective view of a panel member being removed from an instrument panel main body.

In the installed position, the primary alignment post 40 is received in the first aperture 25 such that the first alignment surface 42 generally abuts the first edge 27, the second alignment surface 44 generally abuts the second edge 29, and the third alignment surface 52 and fourth alignment surface 54 also abut the first aperture 25 thereby restricting movement of the panel member 35 with relation to the instrument panel main body 23, with the exception of allowing motion which is generally parallel to the axial direction of the primary alignment post 40. Such design allows the panel member 35 to be separated from the instrument panel 23 when a first type of force is applied, the first type of force being parallel to the axial direction of the alignment post 40. For example, as can be seen in FIG. 2, when a force F1 is applied that is parallel to the extending direction, or axial direction, of the primary alignment post 40, the primary alignment post 40 slides out of the first aperture 25, and the panel member 35 separates from the instrument panel main body 23. A similar separation will occur if the panel member 35 is urged towards the second edge 29 of the first aperture 25, and the first alignment surface 42 of the primary alignment post 40 urged away from the first edge 27 of the first aperture.

When a force of a second type is applied, in the installed position, movement of the panel member 35 is restricted. The second type of force is a force that moves the primary alignment post 40 in a generally axial direction out of the first aperture 25 while at the same urging the first alignment surface 42 of the primary alignment post 40 against the first edge 27 of the first aperture 25. As shown in FIG. 11, the second type of force causes the first alignment surface 42 to slide along the first edge 27 of the first aperture 25 as the primary alignment post 40, which is in the installed position, travels through the first aperture 25 until the first edge 27 of the first aperture 25 engages with the retention notch 26. One common type of application of the second type of force is that resulting from deployment of an airbag, specifically a passenger side airbag.

Figure 3:
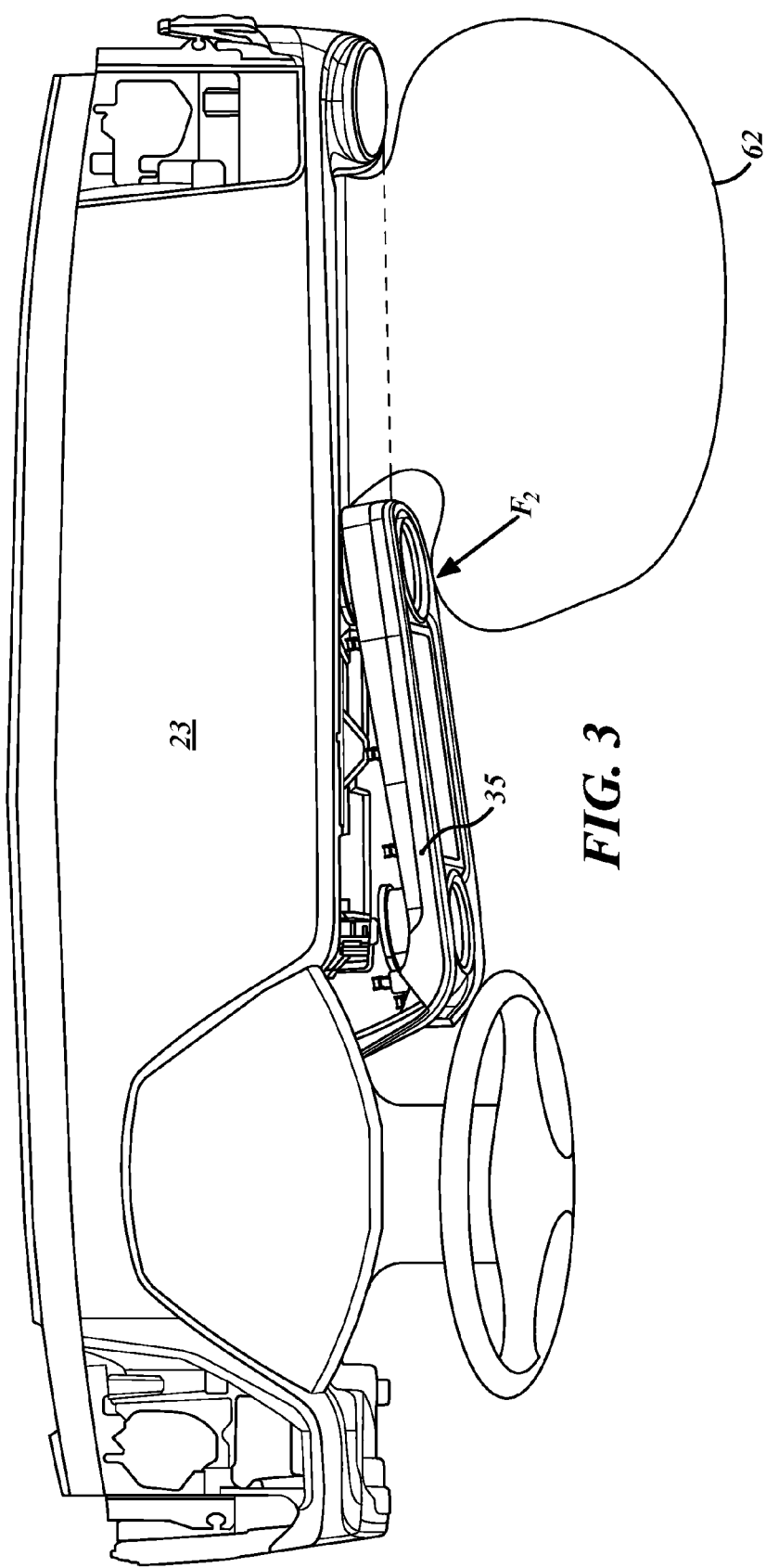
FIG. 3 is a perspective view of a panel member detaching during airbag deployment.
Figure 4:
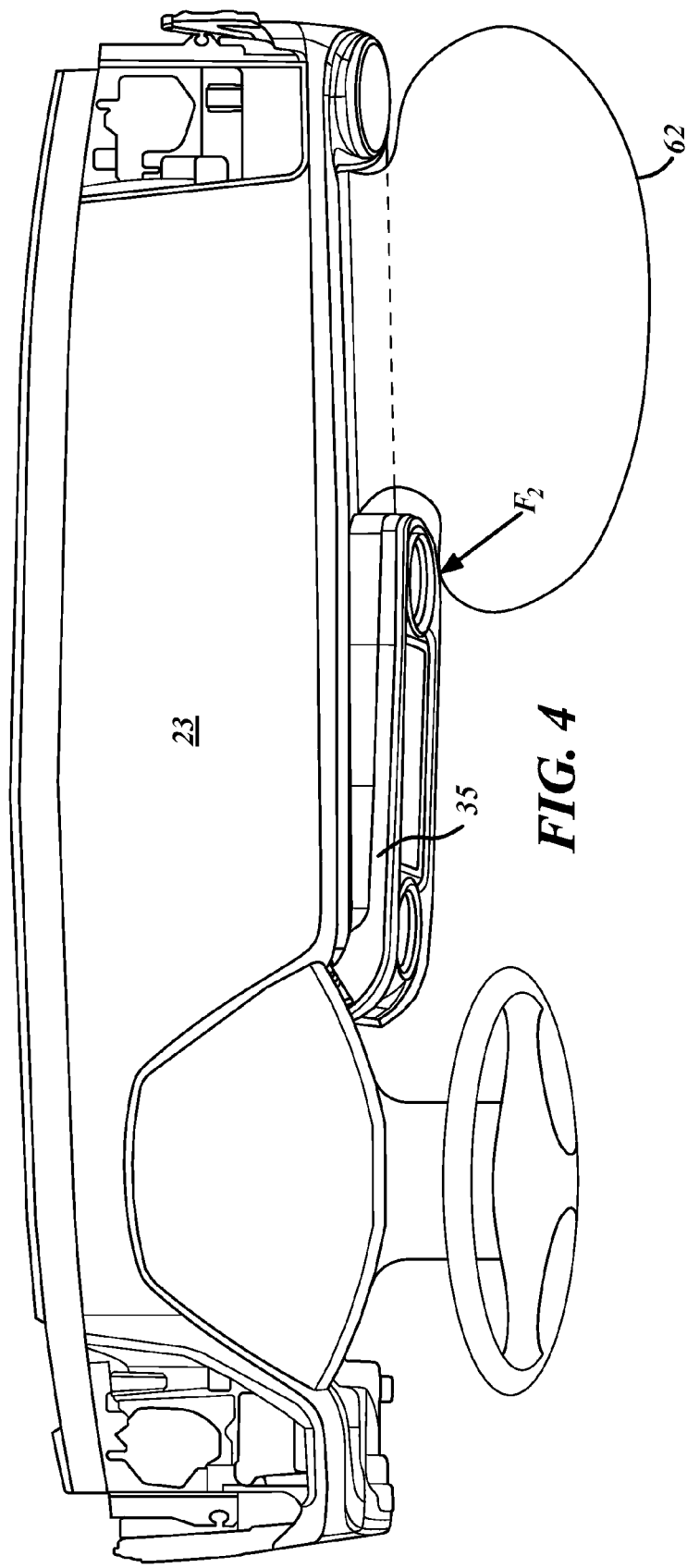
FIG. 4 is a perspective view of a panel member restrained in motion during airbag deployment.
Figure 5:
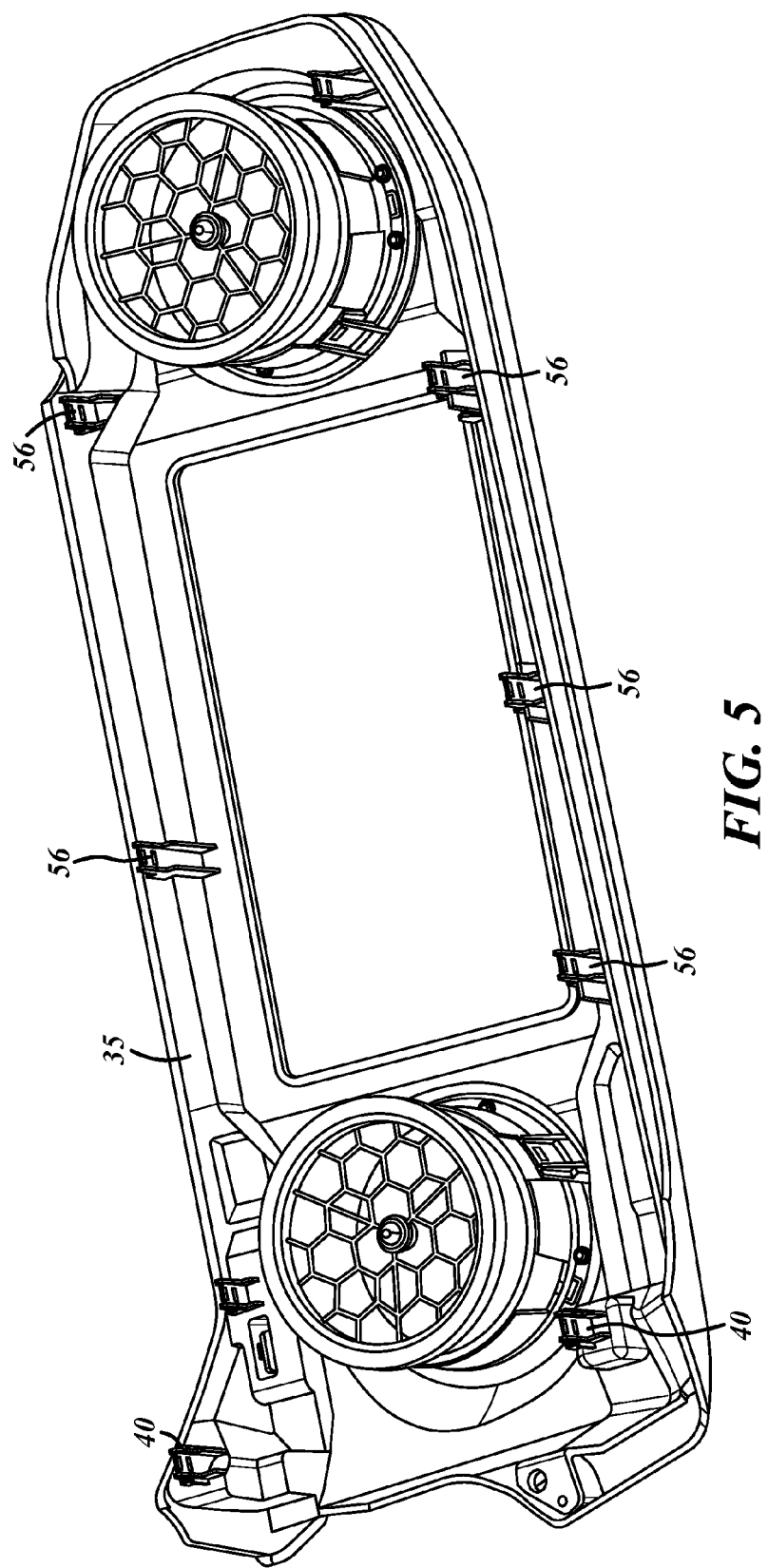
FIG. 5 is a perspective view of the back of a panel member.
Figure 6:
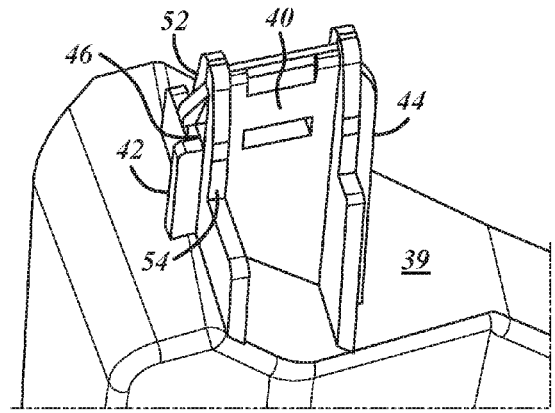
FIG. 6 is a perspective view of a primary alignment post.
Figure 7:
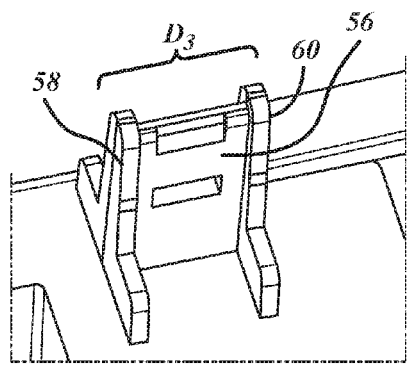
FIG. 7 is a perspective view of a secondary alignment post.
Figure 8:
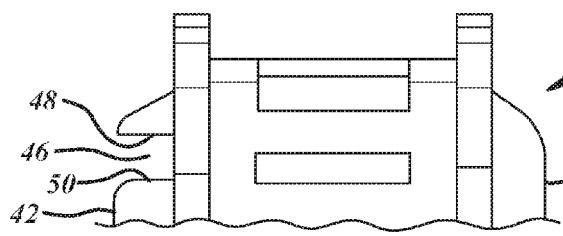
FIG. 8 is a front view of a portion of a primary alignment post.

Application of the second type of force F2 by the passenger side airbag 62 is shown in FIGS. 3 and 4. The force is generated by the deployment of the passenger side airbag 62 which wraps around and overlaps a portion of the panel member 35 at an end of the panel member 35 closest to the passenger side of the vehicle cabin. As the airbag expands is contacts the panel member 35 in the overlap area, pressing the overlapped end of the panel member 35 in towards the instrument panel main body 23. The force applied at the overlap end, and the normal forces from the instrument panel main body 23 pushing back provides a torque on the panel member 35. The torque pulls the end of the panel member 35 opposite the airbag, the end with the primary alignment post 40, away from the instrument panel main body 23 in a direction generally parallel to the axial direction of the primary alignment post 40. Additionally, the force generated by the airbag contact is a vector that not only pushes in on the overlap area of the panel member 35, but also sideways to urge the panel member 35 toward the driver side of the vehicle cabin, causing the first alignment surface 44 of the primary alignment post 40 to be pressed against the first edge 25 of the instrument panel main body 23.

The panel member 35 in FIG. 3 does not have a primary alignment post with a retention notch, or other retention mechanism, and separates from the instrument panel main body 23 when the second type of force F2 is applied. The panel member 35 in FIG. 4 has a primary alignment post with a retention notch, and is restrained in motion when the second type of force F2 is applied.

The instrument panel main body 23, panel member 35, and primary alignment post 40 all may be made from injection molded plastic or any other method known to those skilled in the art.

The embodiment described and illustrated herein may be altered in various ways without departing from the scope or teaching of the present invention. It is the following claims, including all equivalents, which define the scope of the invention.

The invention claimed is:

1. A panel for an instrument panel assembly with an aperture having a pair of opposing edges, the panel comprising:
   a panel member having a front surface and a back surface; and
   a primary alignment post extending from the back surface of the panel member, the primary alignment post having a first alignment surface and an opposing second alignment surface, the first alignment surface having a retention notch;
   the first alignment surface separated from the second alignment surface by a predetermined distance, the predetermined distance is generally equal to a distance between the pair of opposing edges of the aperture;
   wherein the primary alignment post is received by the aperture in an installed position when the panel member is installed on the instrument panel assembly and in the installed position the primary alignment post is freely moveable in an axial direction of the primary alignment post within the aperture when a force of a first type is applied and in the installed position the retention notch catches on the instrument panel and restricts motion of the panel member when a force of a second type is applied.

2. The panel of claim 1 wherein, the retention notch is defined part by a first wall and a second wall.

3. The panel of claim 2 wherein, the first wall is opposing the second wall.

4. The panel of claim 3 wherein, the first wall and the second wall are general perpendicular to the first alignment surface.

5. The panel of claim 1 wherein, the primary alignment post includes a third alignment surface and a fourth alignment surface.

6. The panel of claim 5 wherein, the third alignment surface opposes the fourth alignment surface.

7. An instrument panel assembly comprising:
   an instrument panel main body including a first aperture, an exterior surface and an opposite interior surface, the first aperture defined in part by a first edge and a second edge, the second edge opposing the first edge, the second edge spaced apart from the first edge by a distance, the first edge and the second edge extending between the exterior surface and the interior surface of the instrument panel main body;
   a panel member secured to the instrument panel main body, the panel member having a front surface and a back surface; and
   a primary alignment post extending from the back surface of the panel member, the primary alignment post having a first alignment surface and a second alignment surface, the first alignment surface opposing the second alignment surface, the first alignment surface having a retention notch;

the first alignment surface of the primary alignment post is separated from the second alignment surface of the primary alignment post by a distance, the distance separating the first alignment surface from the second alignment surface is generally equal to the distance the first edge of the first aperture is spaced apart from the second edge of the first aperture;

wherein the primary alignment post is received by the first aperture, the primary alignment post is freely moveable in an axial direction of the primary alignment post within the primary aperture when a force of a first type is applied, and when a force of a second type is applied a portion of the exterior surface and the interior surface adjacent the first edge of instrument panel main body is received within the retention notch thereby restricting motion of the panel member.

8. The instrument panel assembly of claim 7 further comprising:

the instrument panel main body including a second aperture, the second aperture defined in part by a first edge and a second edge the second edge opposing the first edge, the second edge spaced apart from the first edge by a distance;

a secondary alignment post extending from the back surface of the panel member, the secondary alignment post having a first surface and a second surface, the first surface opposing the second surface; and the first surface separated from the second surface by a distance, the distance separating the first surface from the second is less than to the distance the second edge of the second aperture is spaced apart from the first edge of the second aperture, the difference in the distances being within a predetermined range;

wherein the secondary alignment post is received by the second aperture.

9. The instrument panel assembly of claim 7 further comprising:

the instrument panel main body including an airbag, the airbag located adjacent the panel member;

wherein deployment of the airbag applies the force of the second type on the panel member.

10. The instrument panel assembly of claim 9 wherein, the retention notch is defined part by a first wall and a second wall.

11. The instrument panel assembly of claim 10 wherein, the first wall is opposing the second wall.

12. The instrument panel assembly of claim 11 wherein, the first wall and the second wall are general perpendicular to the first alignment surface.

13. The instrument panel assembly of claim 9 wherein, the primary alignment post includes a third alignment surface and a fourth alignment surface.

14. The instrument panel assembly of claim 13 wherein, the third alignment surface opposes the fourth alignment surface.

15. A panel for an instrument panel assembly having an instrument panel main body including a first aperture, an exterior surface and an opposite interior surface, the first aperture defined in part by a first edge and a second edge, the second edge opposing the first edge, the second edge spaced apart from the first edge by a distance, the first edge and the second edge extending between the exterior surface and the interior surface of the instrument panel main body, the panel comprising:

a panel member having a front surface and a back surface; and a primary alignment post extending from the back surface of the panel member, the primary alignment post having a first alignment surface and an opposing second alignment surface, the first alignment surface having a retention notch;

the first alignment surface separated from the second alignment surface by a predetermined distance, the predetermined distance is generally equal to the distance between the first edge and the second edge of the first aperture;

wherein the primary alignment post is received by the aperture when the panel member is installed on the instrument panel assembly, the primary alignment post is freely moveable in an axial direction of the primary alignment post within the aperture when a force of a first type is applied, and when a force of a second type is applied a portion of the exterior surface and the interior surface adjacent the first edge of the instrument panel main body is received within the retention notch thereby restricting motion of the panel member.

16. The panel of claim 15 wherein, the retention notch is defined part by a first wall and a second wall.

17. The panel of claim 16 wherein, the first wall is opposing the second wall.

18. The panel of claim 17 wherein, the first wall and the second wall are general perpendicular to the first alignment surface.

19. The panel of claim 15 wherein, the primary alignment post includes a third alignment surface and a fourth alignment surface.

20. The panel of claim 19 wherein, the third alignment surface opposes the fourth alignment surface.

* * * * *